United States Patent
Seal et al.

(10) Patent No.: US 7,961,554 B2
(45) Date of Patent: Jun. 14, 2011

(54) METHODS AND SYSTEMS FOR ACCURATE TIME-KEEPING ON METERING AND OTHER NETWORK COMMUNICATION DEVICES

(75) Inventors: Brian Keith Seal, Powell, TN (US); John Bettendorff, San Francisco, CA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 412 days.

(21) Appl. No.: 11/972,656

(22) Filed: Jan. 11, 2008

(65) Prior Publication Data

US 2009/0179771 A1     Jul. 16, 2009

(51) Int. Cl.
G04B 47/00   (2006.01)
G04C 11/02   (2006.01)
G08C 15/06   (2006.01)

(52) U.S. Cl. ............... 368/10; 368/47; 340/870.02

(58) Field of Classification Search .......... 368/10, 368/46, 47, 200–202; 370/503, 509; 375/354, 375/356, 358, 362; 340/870.01–870.06
See application file for complete search history.

(56) References Cited

U.S. PATENT DOCUMENTS

| | | | | |
|---|---|---|---|---|
| 5,040,158 A * | 8/1991 | Lee et al. | .......... | 368/10 |
| 5,068,877 A * | 11/1991 | Near et al. | .......... | 375/356 |
| 5,377,232 A | 12/1994 | Davidov et al. | | |
| 5,402,394 A * | 3/1995 | Turski | .......... | 368/10 |
| 5,469,467 A * | 11/1995 | Vella-Coleiro | .......... | 375/358 |
| 5,541,589 A * | 7/1996 | Delaney | .......... | 340/870.02 |
| 5,604,768 A | 2/1997 | Fulton | | |
| 5,661,700 A * | 8/1997 | Weppler | .......... | 368/46 |
| 5,712,867 A * | 1/1998 | Yokev et al. | .......... | 375/136 |
| 5,918,040 A * | 6/1999 | Jarvis | .......... | 713/375 |
| 5,959,549 A * | 9/1999 | Synesiou et al. | .......... | 340/870.02 |
| 6,188,715 B1 * | 2/2001 | Partyka | .......... | 375/134 |
| 6,195,018 B1 * | 2/2001 | Ragle et al. | .......... | 340/870.01 |
| 6,429,785 B1 * | 8/2002 | Griffin et al. | .......... | 340/870.02 |
| 6,452,986 B1 | 9/2002 | Luxford et al. | | |
| 6,591,370 B1 * | 7/2003 | Lovett et al. | .......... | 713/502 |
| 6,639,957 B2 * | 10/2003 | Cahill-O'Brien et al. | .... | 375/354 |
| 6,654,356 B1 * | 11/2003 | Eidson et al. | .......... | 370/303 |
| 6,677,862 B1 | 1/2004 | Houlihane et al. | | |
| 6,856,257 B1 | 2/2005 | Van Heteren | | |
| 7,072,432 B2 * | 7/2006 | Belcea | .......... | 375/356 |
| 7,120,092 B2 * | 10/2006 | del Prado Pavon et al. | .... | 368/46 |
| 7,283,580 B2 * | 10/2007 | Cumeralto et al. | .......... | 375/137 |
| 7,343,255 B2 * | 3/2008 | Osterloh et al. | .......... | 702/62 |
| 7,352,715 B2 * | 4/2008 | Salt et al. | .......... | 370/328 |
| 7,522,639 B1 * | 4/2009 | Katz | .......... | 370/503 |

(Continued)

OTHER PUBLICATIONS

Cellnet Innovations, Inc., "Infinet an Intelligent Solution," 2005.

(Continued)

*Primary Examiner* — Vit W Miska
(74) *Attorney, Agent, or Firm* — Kilpatrick Townsend & Stockton LLP

(57) ABSTRACT

Methods and systems for providing accurate time-keeping on battery-powered communication devices used in AMI systems, mesh networks, and multi-channel radio networks. One embodiment allows the use of low power (and low cost) crystals in battery-powered endpoints by periodically correcting the poor timing of these crystals using communications with a nearby, non-battery-powered device. Such communications allow the battery-powered devices to align their timing with that of their non-battery neighbors, among other things.

15 Claims, 3 Drawing Sheets

U.S. PATENT DOCUMENTS

| | | | |
|---|---|---|---|
| 7,535,931 B1* | 5/2009 | Zampetti et al. | 370/508 |
| 2003/0117899 A1* | 6/2003 | Eidson | 368/46 |
| 2005/0078559 A1* | 4/2005 | Herring | 368/46 |
| 2005/0122231 A1* | 6/2005 | Varaiya et al. | 340/870.01 |
| 2006/0009927 A1* | 1/2006 | Osterloh et al. | 702/46 |
| 2006/0158347 A1* | 7/2006 | Roche et al. | 340/870.02 |
| 2007/0183330 A1 | 8/2007 | Salt | |
| 2008/0075218 A1* | 3/2008 | Monier et al. | 375/371 |
| 2009/0070618 A1* | 3/2009 | Dahlen et al. | 713/500 |

OTHER PUBLICATIONS

Cellnet Innovations, Inc., "Utilinet Wireless Communication," 2005.
Cellnet Innovations, Inc., "Cellnet Endpoints Overview," 2005.

* cited by examiner

METHODS AND SYSTEMS FOR ACCURATE TIME-KEEPING ON METERING AND OTHER NETWORK COMMUNICATION DEVICES

BACKGROUND

1. Field

This disclosure relates generally to improved radio communication, including methods and systems of accurate time-keeping on battery-powered communication devices used in advanced metering infrastructure (AMI) systems, among other environments.

2. Background

Radio communication-based networks are widespread and used for a variety of applications. Such networks are commonly employed in AMI systems that measure, collect, and/or analyze utility usage from electricity, gas, water, and other meters through various communication media. Many AMI systems, particularly those that utilize multi-channel communications, require precise time-keeping on remote communication devices. Generally, the requirement for precise time-keeping has required that devices used in such systems have precise, temperature-compensated crystal oscillators or similar devices, for example, devices having frequency errors as low as 1-2 parts-per-million over a −40 to +85 C operating temperature range. In the case of multi-channel mesh networks, precision is required for hitting frequencies accurately without requiring scanning and searching. More generally, accurate time-keeping at system endpoints (such as meters) facilitates load profiling, consolidated billing, and tamper detection. Unfortunately, precision, temperature-compensated oscillators are comparatively expensive and require more power, making long-term battery operation expensive or altogether non-feasible.

SUMMARY OF THE INVENTION

Accurate time-keeping on network communication devices that use low power time-keeping crystals is disclosed. Such time-keeping is accomplished, for example, by periodically correcting for the poor timing of these crystals using communication with a nearby, more accurate time-keeping device. The low-accuracy devices may be battery-powered and thus may be well suited for use at end point devices in an AMI system, mesh network, and/or multi-channel radio network, among other environments.

A system for collecting commodity consumption-related data from endpoint devices is disclosed. The system comprises a data collection device for receiving commodity consumption-related data originating from endpoint devices through a network of radio nodes. Each radio node is generally capable of communicating with neighboring radio nodes and at least some are attached to endpoint devices. A first radio node estimates an error rate of its crystal oscillator by communicating with a neighboring radio node, having a more time-precise crystal oscillator. This error rate is used to more accurately keep track of time at the first radio node.

A method for collecting commodity consumption-related data from endpoint devices is also disclosed. The method involves providing a mesh network of radio nodes capable of communicating with neighboring radio nodes. The method involves estimating an error rate of a first crystal oscillator of a first radio node based on a communication from a neighboring radio node, having a more time-precise crystal oscillator.

These embodiments are mentioned to provide examples and aid understanding. Additional embodiments and advantages are also discussed in the Detailed Description and will become readily apparent to those skilled in the art. As will be realized, the invention is capable of other and different embodiments, and its several details are not essential, but rather are capable of modifications in various obvious respects, all without departing from the invention. Accordingly, the drawings and description are to be regarded as illustrative in nature, and not as restrictive.

BRIEF DESCRIPTION OF THE FIGURES

The above described and other features, aspects, and advantages of the present disclosure are better understood when the following Detailed Description is read with reference to the accompanying drawings, wherein.

DETAILED DESCRIPTION

Figure 1:
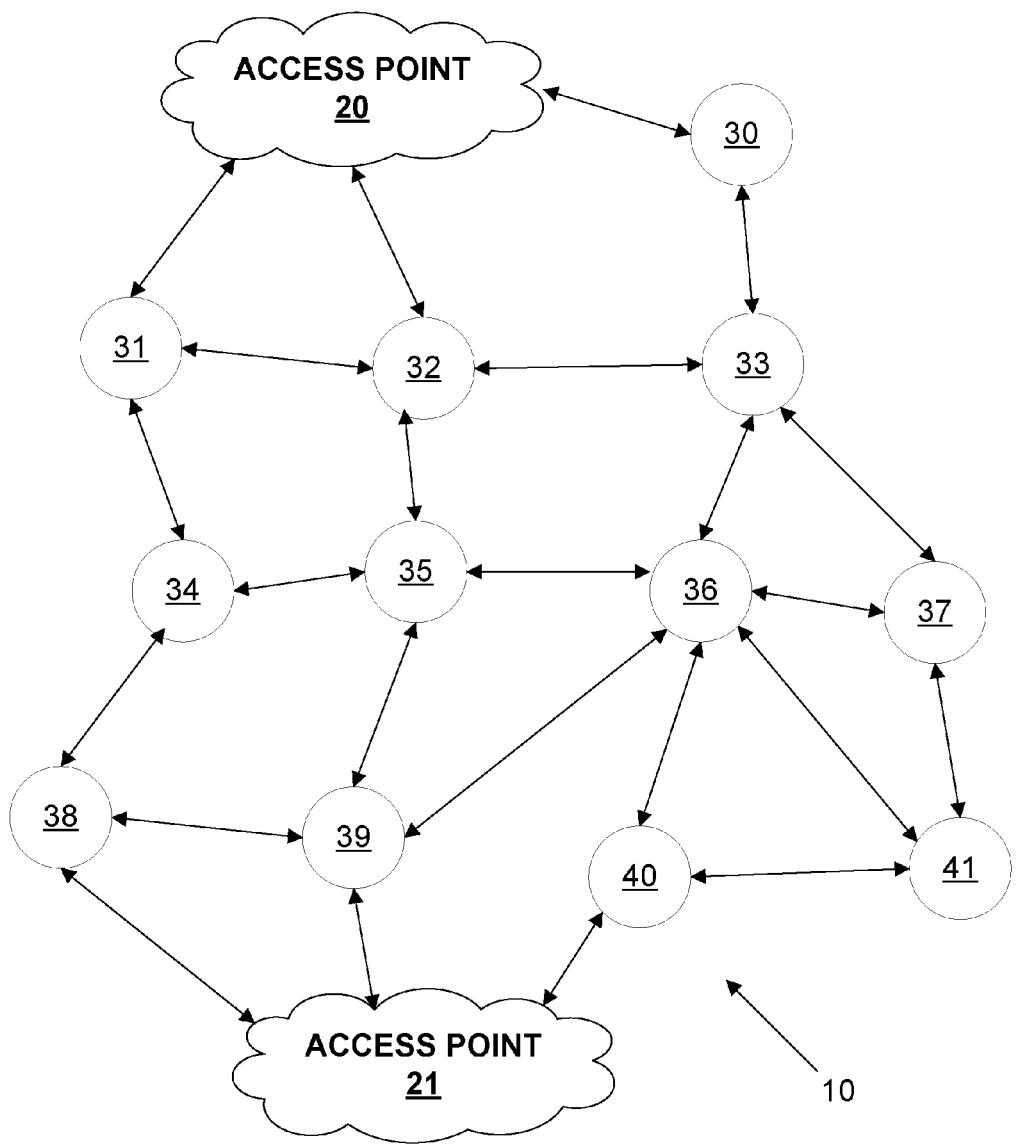
FIG. 1 is a system diagram illustrating an exemplary network environment.

FIG. 1 is a system diagram illustrating an exemplary network environment. Other embodiments may be utilized. The network 10 shown in FIG. 1 comprises access points 20, 21 and other devices, referred to herein as nodes 30-41. The nodes 30-41 work together to create a mesh network in which each node generally comprises a radio that can speak to and respond to neighboring radio devices of neighboring nodes. Each node may comprise or connect to an endpoint device such as a utility meter or appliance, or may not itself comprise or connect to an endpoint device. Thus a node may interact with an endpoint device, act as part of the network, or both, and may do so simultaneously. The radio of each node may have a programmable logic controller (PLC)—like device. Such a device can enable the radio to function like a small computer, carrying out appropriate computing and command functions. Thus intelligence in some or all of the radios may be used to delegate and distribute commands throughout the network 10. The radio may, but need not necessarily, allow two-way communication.

As an example of a utility monitoring network, each node of network 10 that comprises or connects to an endpoint may collect information about utility consumption at that endpoint and send such information through the network 10 to an access point 20, 21, where it may be collected by a utility company, for example, for billing and/or monitoring purposes. As a more specific example, an end-point device radio may generate a packet of data that is transmitted to some destination, such as an access point destination. The packet may be addressed to the destination and entered into the network. The data packet traverses the network by hopping from radio to radio (node to node) in the direction of the destination-addressed radio. The route chosen for traversing the network may be dynamic and/or may employ automatic rerouting in the event a particular data path is not clear. Generally, the network 10 will attempt to minimize the number of hops to increase transmission speed.

The radio and/or other components at a node of the network may be battery-powered, line-powered, or powered by any other suitable power source and attached via any suitable connection. Nodes will also generally comprise a time-keeping component such as a crystal oscillator. As an example, a battery-powered node may have a lower precision crystal oscillator since the power consumption of such devices is generally low enough for battery-applications. A non-battery-powered node, such as a node at an electric meter endpoint or a node in an overhead/lamppost-type radio, may receive power from a non-battery AC source and thus utilize a device having higher-precision, long-term time-keeping capability.

Figure 2:
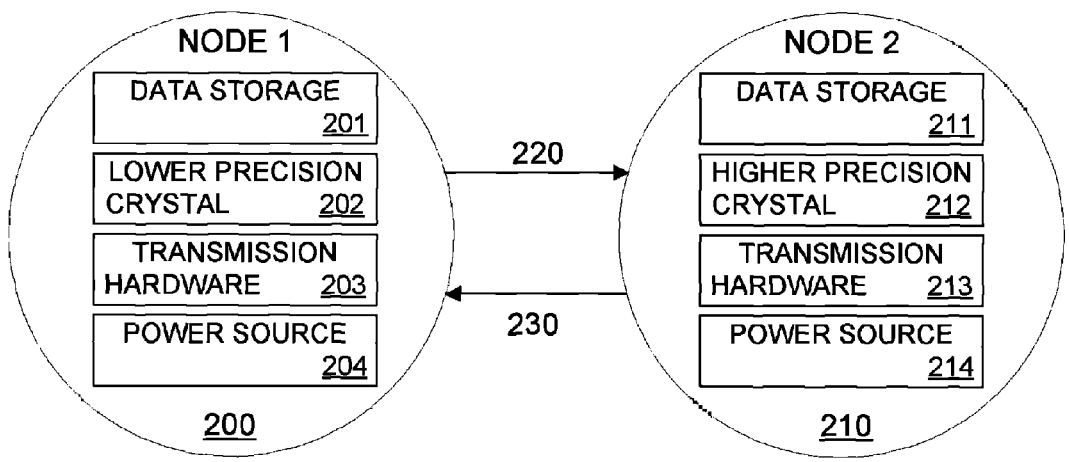
FIG. 2 is a flow diagram showing communication between nodes of an exemplary network.

FIG. 2 is a flow diagram showing exemplary communication between nodes 200, 210. The first node 200 comprises a data storage component 201, a lower precision crystal oscillator 202, transmission hardware 203 such as a radio, and a power source 204 such as a battery or AC connection. The second node 210 comprises a data storage component 211, a higher precision crystal oscillator 212, and transmitter 213 such as a radio, and a power source 214 such as a battery or AC connection. Generally, higher precision crystals have an error in the range of about 1 to 5 parts per million (ppm), whereas lower precision crystals such as tuning fork crystals usually have an error in the range of about 100 to 200 ppm. In one embodiment of the present invention, the first node 200 is battery-powered and the second node is non-battery-powered.

After installation, device 200 may be programmed to search for a more time-precise neighbor radio 210 and capture the time of that neighbor. After a short period of time, for example five minutes, the first node 200 again communicates 220, 230 with the second node 210. For example, the first node may send a packet 220 comprising information about the amount of commodity consumed at an associated endpoint (not shown) and receive an acknowledgment 230 from the second node 210. Based on the installation time capture and subsequent time capture after the first short time period, the first node 200 may make a first time-based adjustment (e.g., 1 second is not 32768 clk cycles exact, it is 32768.5 clk cycles). With this correction, the first node may then wait thirty minutes before communicating again. From then-on, the first node may need only continue re-adjusting every thirty minutes, every hour, or at whatever time increment is sufficient to compensate for temperature changes, aging, and other factors.

Generally time keeping accuracy at a first node may be improved by gathering information from a neighboring node with more accurate time keeping capabilities. As an example, one or more communications 220, 230 may be used to facilitate or otherwise improve the time-keeping capability at the first node 200. For example, time information, such as the time of day or time elapsed from a given point in time known to both nodes, may be used. Such information may be used to assess the time keeping at the first node (for example, whether the first node is gaining two seconds every hour, twenty seconds every hour, losing a second every hour, etc.)

Information from a more time precise neighbor can be used to compare time keeping rates. For example, the assessed time elapsed between communication exchanges, such as two exchanges that are about one hour apart, may be compared. As an example, such an elapsed time according to the lower precision crystal oscillator 202 can be compared a time elapsed according to the higher precision crystal oscillator 212 to determine a correction factor for the lower precision crystal oscillator 202. Additional considerations may also be accounted for in some embodiments. For example, while the actual time of an RF signal in the air is near zero (i.e. it is received as it is modulated), if a packet is 100 bytes, it can take 100 mS to send at 9600 baud.

Such timing may be accounted for or designed around. As an example, a sending radio may insert information about its time keeping (e.g., an elapsed time) during a transmission. As bytes are shifted out during transmission of a packet, the sending radio's time information may be inserted late in the process. The receiving radio then takes note of it's own time information (e.g., a corresponding elapsed time) at a particular point in the reception of this packet. The number of bits of transmission between the transmitter grabbing his "time" and the receiver taking note of his own "time" is accounted-for in comparing the time keeping information (e.g., computing a true difference between the two elapsed times).

A new (i.e. revised) correction factor may be calculated each time data is exchanged between the two nodes 200, 210, since upon each new communication exchange, a new comparison of elapsed time is possible. This allows for necessary changes in the correction factor as aging and temperature change the frequency of the lower precision crystal. For example, node 200 may periodically, e.g., every hour, send consumption data through the network and some or all of these communications may also provide the node 200 with information from neighboring node 210 that allows node 200 to more accurately keep time than it otherwise could.

Such a correction factor may be used to ensure greater time keeping accuracy. Improved time keeping accuracy has a variety of benefits and, as described above, allows the use of battery powered devices in networks for which they have previously been ill-suited. Thus, one advantage of one embodiment of the invention is the ability to utilize a hybrid system made up of AC powered radios that measure elapsed-time accurately and battery-powered radios that can track the more accurate radios even though the battery-powered radios themselves lack good time-keeping capability.

In the case of a channel hopping network, accurate time may be used to ensure that the first node 200 transmits communications at an appropriate time (and/or on an appropriate channel), for example, at a correct time within a hopping sequence. An embodiment of the present invention makes possible the use of battery powered radio nodes in channel hopping networks.

Figure 3:
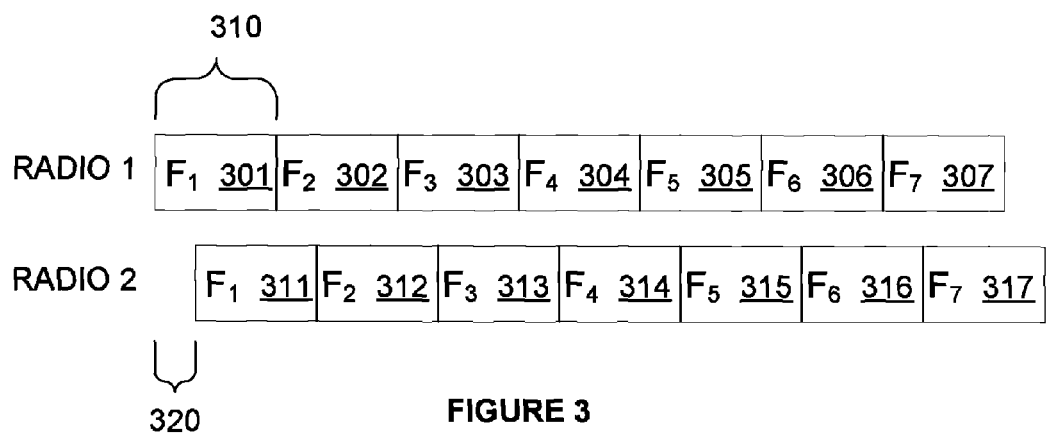
FIG. 3 is an illustration of exemplary differences in hopping sequence between two radios.

FIG. 3 is an illustration of an exemplary differences in hopping sequence between two radios. The radios utilize a multi-channel communication scheme which is supported by accurate time-keeping at each radio node. At any given point in time, a radio is going through its hopping sequence. For example, RADIO 1 of FIG. 3 has a hopping sequence $F_1$ 301, $F_2$ 302, $F_3$ 303, $F_4$ 304, $F_5$ 305, $F_6$ 306, $F_7$ 307 and RADIO 2 has a similar sequence $F_1$ 311, $F_2$ 312, $F_3$ 313, $F_4$ 314, $F_5$ 315, $F_6$ 316, $F_7$ 317. Each block of the hopping sequence represents an increment of time or dwell time 310, for example, 700 milliseconds, in which the radio will transmit or receive over a given channel or on a given frequency. Radios in a multi-channel system of this type generally need to be able to accurately keep time so that communications between radios are made on the appropriate channel. In other words, accurate time-keeping is important to ensure that the hopping sequences of the various radios are sufficiently in sync to allow communication. FIG. 3 illustrates that the hopping sequence of RADIO 1 is slightly out sync with the hopping sequence of RADIO 2. The amount the radios are out of sync 320 can grow over time and may ultimately prevent communication if not corrected.

A frequency-hopping system may be employed that does not keep all radios in-sync as they move through the hopping sequence. In such a case, a first radio's hopping sequence may be different from a second radio's hopping sequence. The second radio may, however, track where radio 1 is in its own hopping sequence. The first radio's time-keeping error can be determined by comparing the first radio's understanding of its own hopping sequence position with the second radio's understanding of where the first radio is in its hopping sequence. Allowing radios to hop independently may provide advantages with respect to use of the full available spectrum without interference.

Thus, in certain embodiments, differences in hopping sequence position are used to facilitate accurate time-keeping. For example, the first node 200 may send a packet of information to the second node 210. In response, the second node may send an acknowledgment packet including information about where in a hopping sequence the transmitter 213 is (or would be at the time of transmission). At the instant the receiver 203 receives the transmission (generally sufficiently close in time to the transmission time for comparison purposes), the receiver 203 also measures where it is in the hopping sequence. The hopping sequence information is compared to determine a difference, for example, the node 2 transmitter 213 may be 1000 ms ahead of the node 1 radio 203. At the next transmission exchange, the process is repeated and a second difference is computed, for example, the node 2 transmitter 213 may be 1024 ms ahead of the node 1 radio 203 determined one hour later. Thus, over this hour, the first node 200 was 24 ms slower. The first node can utilize this correction factor in any suitable manner to facilitate accurate time-keeping.

Figure 4:
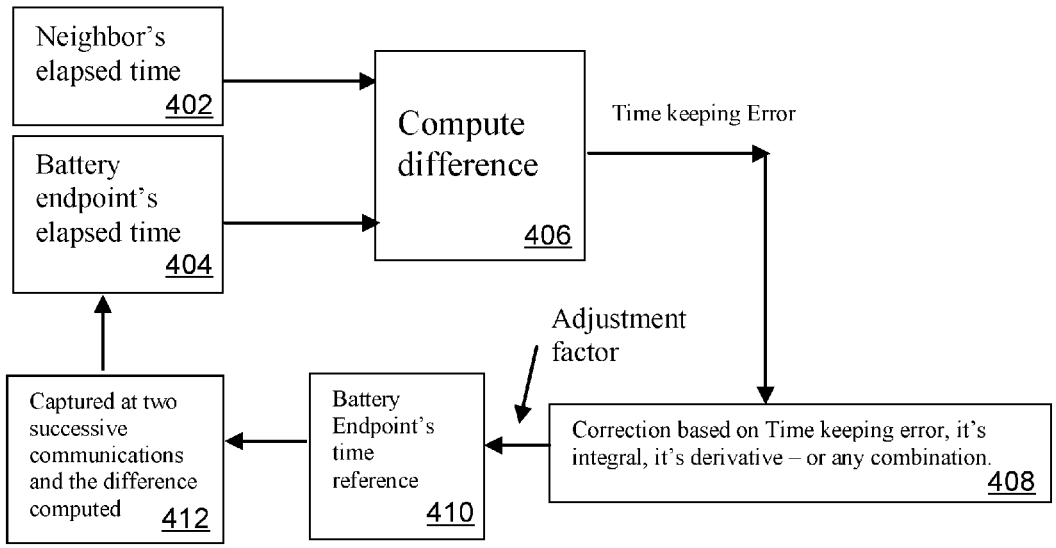
FIG. 4 is a flow chart illustrating an exemplary time adjustment technique.

FIG. 4 provides a flow chart of an exemplary time adjustment technique 400. In block 406, a difference is computed using a battery endpoint's measure of an elapsed time 404 and a neighbor's measure of a corresponding elapsed time 402. The difference is used as or to otherwise determine a first estimate of the time keeping error at the battery endpoint. A correction is made based on this first estimate of the time keeping error, as shown in block 408. An adjustment factor is used to updated the battery endpoint's time reference, as shown in block 410. For example, the battery endpoint may change the divisor used to determine how many crystal oscillator ticks equals a second.

As shown in block 412, capturing two successive communications may be repeated on a periodic or irregular basis and the computed differences stored for subsequent use. The adjustment to the time-keeping mechanism of the battery endpoint may be based solely on the most recently computed difference. Alternatively, the adjustment may be adjusted based upon multiple computed differences. As examples, the correction may be based on an average difference, a rolling average difference, or any other suitable combination of differences. As an example, over time, the battery endpoint may recognize that it is averaging 24 ms/hour slower and make an appropriate adjustment. Thus, the adjustment factor determined in block 408 may be based on one or more measured time keeping errors, its integral, its derivative, or any combination of suitable attributes. For example, an algorithm may be used to assess previous error measurements and determine or estimate the rate at which the error is changing.

One embodiment of the present invention provides a system for collecting commodity consumption-related data from endpoint devices. The system comprises data collection devices such as the access points 20, 21 shown in FIG. 1 and a mesh network such as the network of nodes 30-41 shown in FIG. 1. Each node, or radio node, is capable of communicating with one or more neighboring radio nodes of the mesh network. At least some of the radio nodes are each attached to an endpoint device. An attached endpoint device may be part of a node or physically located separate from the node.

At least a first radio node of the network keeps track of time using both (a) its own crystal oscillator and (b) by communication with a neighboring radio node. This neighboring radio node comprising a neighboring crystal oscillator having greater time-keeping precision than the first crystal oscillator of the first device. Since the first radio node uses a lower powered crystal oscillator it may employ a battery, rather than a line AC power supply or other type of power supply, to power its radio, oscillator, and/or other components. Since the neighboring crystal oscillator has greater precision, it will generally require a non-battery power source such as an AC power line, solar power, etc. The greater precision device could be powered by a more powerful battery than the lesser precision device. The greater precision crystal oscillator may have some time-keeping error that may or may not be adjusted periodically according to known techniques, for example to correct the crystals time or time base.

Regardless of the power supplies used by the nodes of the network, the first radio node may keep track of time by comparing a first elapsed time according to the first crystal oscillator to a neighboring elapsed time according to the neighboring crystal oscillator. The neighboring elapsed time may be communicated to the first radio node as part of its direct communication with the neighboring radio node, for example, in one or more communication packets sent from the neighbor. The elapsed time determined may be based on differences in hopping sequence position in the case of a channel hopping embodiment. In any case, the first radio node may use the communication with the neighboring node to calculate a correction factor, for example, based on a consistent or average difference in elapsed times that is recognized over time, that is, over a series of comparisons. Whether the first node looks at the neighbor's position in a hopping sequence, it's "real-time" value, or some other time attribute, the lower precision device is able to compare its time or time keeping attributes to those of its higher precision neighbor.

The time-keeping performed at the first node may be used for a variety of advantages and purposes. For example, the first radio node may communicate with the neighboring radio node at data transmission intervals, each data transmission interval having a duration. The duration of the data transmission intervals may be adjusted using the correction factor or otherwise based on time-keeping information received or derived from a neighboring node. A communication from the neighboring radio node to the first radio node may comprise a time of day. This time of day information may be employed, for example, at an endpoint node, for example, to enhance consumption data so that consumption data reflects time of use. A variety of other advantages to having time of day information at an endpoint node will be understood by those of skill in this area.

Figure 5:
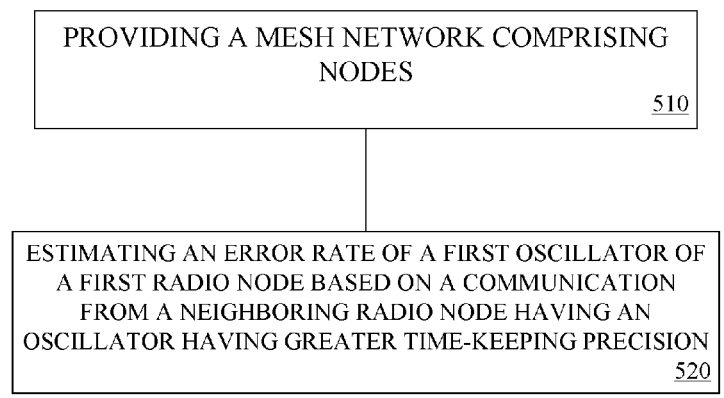
FIG. 5 is a flow chart illustrating an exemplary method for estimating an error rate.

FIG. 5 is a flow chart illustrating an exemplary method for estimating an error rate. The method comprises providing a mesh network of radio nodes, some or all attached to endpoint devices, as shown in block 510. For example, the mesh network may resemble the network 10 depicted in FIG. 1.

The method of FIG. 5 further comprises estimating an error rate of a first crystal oscillator of a first radio node based on a communication from a neighboring radio node having an oscillator having greater time-keeping precision, as shown in block 520. Estimating the error rate may involve comparing a first elapsed time according to the first crystal oscillator to a neighboring elapsed time according to the neighboring crystal oscillator. The neighboring elapsed time may be communicated to the first radio node as part of its direct communication with the neighboring radio node, for example, in one or more communication packets sent from the neighbor.

General

The foregoing description of the embodiments of the invention has been presented only for the purpose of illustration and description and is not intended to be exhaustive or to limit the invention to the precise forms disclosed. For example, an endpoint or other node, whether battery-powered or otherwise, could contain both a low power oscillator and a higher powered oscillator and only utilize the higher powered oscillator for brief periods of frequency comparison. In addition, the uses of accurate time keeping in battery powered devices are numerous and not limited by the examples described herein. The techniques of the invention are not limited to AMI systems, mesh networks, or any other particular network configuration. Thus, in general numerous modifications and adaptations are apparent to those skilled in the art without departing from the spirit and scope of the invention.

That which is claimed:

1. A system comprising:
   a data collection device for collecting commodity consumption-related data from endpoint devices; and
   a mesh network comprising radio nodes, wherein each radio node is capable of communicating with one or more neighboring radio nodes of the mesh network and wherein at least some of the radio nodes are attached to endpoint devices;
   wherein a first radio node of the mesh network comprises a first crystal oscillator and a neighboring radio node of the mesh network comprises a neighboring crystal oscillator having greater time-keeping precision than the first crystal oscillator, the first radio node configured to estimate an error rate of the first crystal oscillator by communicating with the neighboring radio node to compare elapsed time according to the neighboring crystal oscillator with elapsed time according to the first crystal oscillator; and
   wherein the first radio node further comprises a battery as the only power source for the first crystal oscillator and the neighboring crystal oscillator receives power from a non-battery power source.

2. The system of claim 1, wherein the first radio node is configured to periodically estimate the error rate of the first crystal oscillator by communicating with the neighboring radio node.

3. The system of claim 1, wherein the first radio node is configured to estimate the error rate of the first crystal oscillator by communicating with the neighboring radio node as part of communications relating to commodity consumption-related data.

4. The system of claim 1, wherein communicating with the neighboring radio node comprises only the first radio node receiving a communication from the neighboring radio node.

5. The system of claim 1, wherein communicating with the neighboring radio node comprises the first radio node transmitting a communication to the neighboring radio node and the first radio node receiving a communication from the neighboring radio node.

6. The system of claim 1, wherein the first radio node communicates with the neighboring radio node on a multi-channel network.

7. The system of claim 6, wherein the first radio node transmits data based on both a hop sequence and time-keeping based on (a) the first crystal oscillator and (b) the error rate of the first crystal oscillator.

8. The system of claim 1, wherein the error rate of the first crystal oscillator is based on an error sustained over a series of communications with the neighboring radio node.

9. The system of claim 1, wherein the first radio node is configured to use the error rate of the first crystal oscillator to adjust how many crystal ticks represents a time increment.

10. The system of claim 1, wherein the system is an AMI system.

11. A system comprising:
    a data collection device for collecting commodity consumption-related data from endpoint devices; and
    a mesh network comprising radio nodes, wherein each radio node is capable of communicating with one or more neighboring radio nodes of the mesh network and wherein at least some of the radio nodes are attached to endpoint devices;
    wherein a first radio node of the mesh network comprises a first crystal oscillator and a neighboring radio node of the mesh network comprises a neighboring crystal oscillator having greater time-keeping precision than the first crystal oscillator, the first radio node configured to estimate a time-of-day by communicating with the neighboring radio node to compare elapsed time according to the neighboring crystal oscillator with elapsed time according to the first crystal oscillator; and
    wherein the first radio node further comprises a battery as the only power source for the first crystal oscillator and the neighboring crystal oscillator receives power from a non-battery power source.

12. The system of claim 11, wherein the first radio node is configured to periodically estimate the time-of-day by communicating with the neighboring radio node.

13. A method comprising:
    providing a mesh network comprising radio nodes, wherein each radio node is capable of communicating with one or more neighboring radio nodes of the mesh network and wherein at least some of the radio nodes are attached to an endpoint device;
    estimating an error rate of the first crystal oscillator of a first radio node of the mesh network based on a communication from a neighboring radio node of the mesh network to compare elapsed time according to a neighboring crystal oscillator of the neighboring radio node with elapsed time according to the first crystal oscillator, the neighboring crystal oscillator having greater time-keeping precision than the first crystal oscillator of the first device; and
    powering the first radio node with only a battery and powering the neighboring radio node with a non-battery power source.

14. The method of claim 13 further comprising estimating the error rate of the first crystal oscillator each time a communication is received at the first radio node from the neighboring radio node.

15. The method of claim 13, wherein estimating the error rate comprises determining an error sustained over a series of communications with the neighboring radio node.

* * * * *